United States Patent [19]

Ross

[11] 4,345,499
[45] Aug. 24, 1982

[54] METHOD FOR THE PRODUCTION OF SAWBLADES, ESPECIALLY JIGSAW OR SABRESAW BLADES

[76] Inventor: Frank L. Ross, 35 Rygårds Allé, DK-2900 Hellerup, Denmark

[21] Appl. No.: 147,184

[22] Filed: May 6, 1980

[30] Foreign Application Priority Data

May 10, 1979 [DK] Denmark .......................... 19461/79

[51] Int. Cl.³ ...................... B27B 33/12; B23D 63/00
[52] U.S. Cl. .................................... 83/835; 76/112
[58] Field of Search .................. 76/112, 25 R, 104 R, 76/101 R; 30/346, 351; 83/835, 838

[56] References Cited

U.S. PATENT DOCUMENTS 2,760,266  8/1956  Sanders .............................. 76/104 R
2,771,918  11/1956  Watson ................................ 83/835

FOREIGN PATENT DOCUMENTS 80537  2/1956  Denmark .
959324  3/1957  Fed. Rep. of Germany .
1088943  9/1954  France ................................. 76/25 R
82289  9/1919  Switzerland ......................... 76/112
235076  3/1945  Switzerland ......................... 76/112
840784  7/1960  United Kingdom .
1028739  5/1966  United Kingdom .

*Primary Examiner*—Roscoe V. Parker
*Attorney, Agent, or Firm*—Synnestvedt & Lechner

[57] ABSTRACT

A sawblade is manufactured by a swaging or cold-forging operation so as to be either complete with teeth and relief indentations on the side surfaces of a blade body or by producing a sawblade body with a seat wherein a separately formed toothed insert may be fastened, e.g. by soldering, brazing or welding.

4 Claims, 7 Drawing Figures

Fig 1.
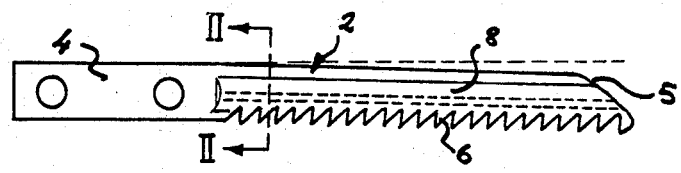
Fig 2.
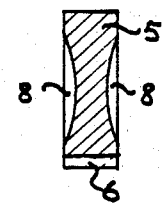
Fig 3.
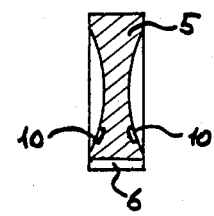
Fig 4.
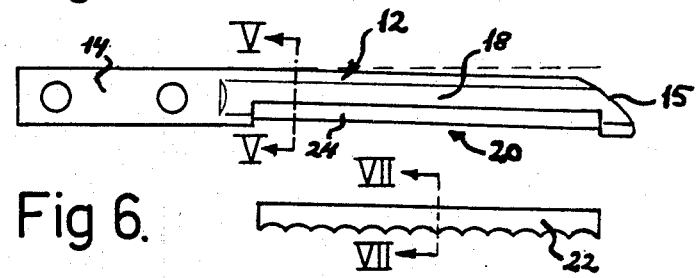
Fig 6.
Fig 5.
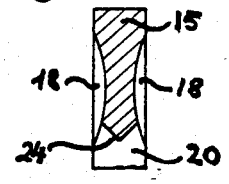
Fig 7.

METHOD FOR THE PRODUCTION OF SAWBLADES, ESPECIALLY JIGSAW OR SABRESAW BLADES

The present invention relates generally to sawblades, and more particularly, to the production of sawblades, especially jigsaw or sabresaw blades, but also circular, hand, and machine sawblades.

With the use of motor-driven sawing machines with vertical or horizontal reciprocal action there is often the risk of blade breakage due to the instability of hand-operated power tools, the difficulties involved in guiding the blade through materials and at the same time avoiding binding and burning. It is therefore of critical importance that replacement blades can be manufactured at an optimum low price with due regard for quality and function.

In connection with a cutting operation there is an inevitable build-up of debris or chips in the blade base or gullet, thereby reducing the cutting properties considerably. There is also the effect of pressure or a tendency of the work-piece to bind together in the space or kerf created in the wake of the teeth's path through the workpiece. To overcome these liabilities it is customary to "set the teeth", e.g. to bend or project the tooth away from the the axis line of the blade body whereby providing relief space for it to move freely through the workpiece and eject the debris.

As alternatives to "setting" of teeth there are also configurations that permit the teeth to remain in a straight row by hollow-grinding or taper-grinding, the former creating a concave groove on the sides of the blade, the latter creating a conical cross-sectional shape with the back of the blade being then approximately two-thirds and width of the teeth to provide a similar relief area. Both of these operations are time-consuming and expensive. To date, most manufacturers consider these techniques to be an unavoidable burden. An even more expensive method is used by a few manufacturers whereby a complete blade is formed with the use of diamond crush rolls (sometimes called profile grinding). The latter requires a capital investment only the most affluent companies can afford.

It is thus concluded that there is a realistic need for a method to reduce manufacturing costs to provide blades in economic lots at low unit cost without heavy capital investment, and it is a general object of the invention at hand to satisfy such need.

In accordance with one aspect of the invention, there is provided a method for the production of sawblades in particular, but not exclusively, jigsaw blades or sabresaw blades, the method comprising the step of forming in one continuous, but segmented die-swaging or cold-forging operation a basic blade body with unset teeth along a cutting edge and with a relief groove, depression or hollow extending along said cutting edge on opposed side surfaces of said blade body.

In accordance with another aspect of the invention, there is provided a method for the production of saw blades, especially jigsaw or sabresaw blades, the method comprising the steps of die-swaging or cold-forging an elongate basic blade body with a longitudinal groove or depression on each side surface and with a cut-out or slot formed on the edge normally reserved for cutting teeth, and subsequently affixing in said slot a preformed tooth stick or insert.

Thus, the present invention serves to manufacture a sawblade, especially a jigsaw or sabresaw blade, by a special form of stamping or metalforming usually called "swaging". In a single operation, involving compound strokes, a complete sawblade can be swaged including teeth (unset), shank (in any form), recessed sides (hollow or tapered form), in any desired width or thickness, with or without canted body. The process is cold-forming and incurs the added benefit of "work-hardening" or deformation hardening. Work-hardening permits the use of relatively softer steels that could permit a hardness suitable enough (for non-metalcutting) to obviate further heat treatment.

Another advantage in the swaging of teeth and the recessed relief area in a circular sawblade is to simultaneously swage concentric grooves (beadings) from the center or arbor hole outward toward the final groove or relief area adjacent to the teeth, the number and width of the concentric grooves (or beads) being dependent on the diameter and thickness of the blades. The swaging sets up counter-stresses in the steel thereby straightening the blade and evening out the stress caused in previous operations and the swaging of teeth itself.

A further variation resulting from this promising technique is the formation by swaging of a recessed groove along the edge where teeth would normally be formed. Into this groove a separately formed insert of carbide with pre-formed teeth or other suitable materials can be positioned and fastened by brazing or welding; the swaged side grooves (recess hollows) or tapered back providing relief to the unset teeth. Hitherto the manufacture of a proper carbide jigsaw blade has been inhibited by the necessity of going through the operation of forming a conventional blade and then adapting it to the carbide. According to the invention, the swaging operation provides a ready-made "blank" for the further manufacture of a carbide blade, the final result being a radically reduced cost of manufacture permitting the marketing of a blade at a price suitable for the mass market.

This new method of swaging, as referred to above, also permits the inclusion of a bevel or cant in any blade, especially a jigsaw blade, which functions to free the blade from the kerf in the workpiece on the down (or non-cutting) stroke creating a much faster blade due to the reduction of friction but without the disadvantage of traditionally "canted" blades (normally angled at the shank) which have a rounding effect on the workpiece. The swaging method allows a more precise and gradual "cant" to the blade minimizing the rounding effect.

The following is a more detailed description of the present invention with references to the accompanying drawings in which FIG. 1 depicts an execution of a complete jigsaw blade produced in the manner heretofore described as the fundamental precepts of this invention;

FIG. 2 shows a cross-section in accordance with line II—II as illustrated in FIG. 1;

FIG. 3 is a cross-section similar to FIG. 2, but showing an optional embodiment with an extra relief beading, channel or groove;

FIG. 4 illustrates an embodiment of the basic blade body of a sawblade in accordance with the invention and with a cut-out or recess or slot where the teeth are normally located;

FIG. 5 is a cross-section taken along the line V—V in FIG. 4;

FIG. 6 illustrates a toothed insert ready for assembly in the basic sawblade body of FIG. 4; and FIG. 7 is a cross-section taken along line VII—VII in FIG. 6.

Reference is made to FIG. 1, which shows a jigsaw blade comprising a basic sawblade body 2 having a shank 4 with a typical configuration for mounting in the saw's chuck and a teeth-carrying portion 5. Cutting teeth 6 are formed integrally with the body and shank and immediately above the set of cutting teeth is located a relief hollow or groove 8 formed parallel to the back and extending through substantially the entire length of the cutting edge on both sides of the blade.

The relief grooves or hollows 8 can be formed by providing the blade body or the teeth-carrying portion 5 thereof with a generally bi-concave or conical cross-section which effectively separates the tooth-bearing edge from the blade's back as can be observed in for cross-section view of FIG. 2. Optionally, an additional longitudinally extending groove 10 can be formed on both sides and immediately above gullets of the cutting teeth 6 (see FIG. 3). This additional groove can function as a supplement to the major relief groove 8, as a channel for debris removal, and as a heat barrier during processing of metalcutting blades. Such a groove has an important function in the swaging of so-called thin-back or scroll-cutting blades which have approximately half the width of the blades depicted in FIGS. 1 and 2, thus requiring a more effective relief area.

Pursuant to this invention, sawblades as that described above are produced by a cold-forging operation called "swaging" (similar to the method used in minting coinage). For all effects, the blade formed under this process is virtually complete containing a shank for mounting in a chuck, a tooth-bearing cutting edge and a concave or hollow recess acting as a relief in the absence of set teeth. The only further operation required for non-metal cutting blades would be the optional sharpening or grinding of teeth which can be accomplished more efficiently since the teeth remain in perpendicular form; metalcutting blades would require heat-treating to bring up blade hardness.

FIG. 4 shows an embodiment of a blade body 12 for a sawblade prepared in accordance with a variation of the method according to the invention. This blade body 12 is formed much the same as that in FIG. 1 with shank 14, teeth-carrying part 15, canted back, and relief grooves 18, except that where the cutting teeth would normally be, an opening or cut-out or slot 20 is formed to act as a "seat" or receptacle for the later positioning of a pre-formed toothed insert 22 prepared of another material, e.g. tungsten carbide, joined to the blade body by brazing or welding techniques.

The slot or receptacle 20 is formed to accept an insert 22, and FIG. 6 shows just such an example of an insert to be fixed in place by brazing or welding. In the illustrated embodiment the receptacle 20 is illustrated as a cut-out or slot in the blade body 12 or in the teeth-carrying part 15 thereof with a sloped edge 24 which runs the length of the bottom or base of the cut-out. The sloped edge 24 can be seen also in FIG. 5 and, as in FIG. 7, the insert 22 in cross-section has a V-shaped groove 26 that is complementary to the sloped edge 24. FIG. 6 shows the toothed insert and FIGS. 5 and 7 illustrate the form and receptacle for the insert.

Having attached the insert 22 by brazing or welding, the teeth may be ground. The grinding, heretofore regarded as prohibitively expensive due to the difficulties inherent in grinding set teeth (crush or profile techniques) or hollow-grinding the blade body. The elimination of the tooth-set offers the principal economic advantage.

The slope-formed edge 24 along the bottom of the cut-out 20 can function as a centering device for the insert during the assembly, thus fitting exactly the dimensions of the slot and providing a continuous smooth surface to the cutting edge. The brazing or welding will then give a secure and permanent anchorage to the insert 22 in the slot 20.

After affixing the insert in its slot 20 the pre-formed teeth may then be ground relative to the blade body 12 and its newly mounted insert 22. As related above it is not necessary for the teeth to have a "set", the relief groove 8 acting as a substitute for the "set". The inset can be formed beforehand and may be of another material, e.g. tungsten carbide, than that of the blade body 12. In fact, the blade body could be made of cheaper materials which have appropriate cold-forming properties.

The invention at hand permits one, through the described swaging operation, to produce either a completely finished sawblade (FIG. 1) or a semi-finished blank as shown in FIG. 4, manufactured with a slight cant or bevel between the longitudinal axis preceding the shank end, respectively 4 and 14, and the longitudinal axis of the tooth-carrying portions 5 and 15 which is indicated by a broken line in FIGS. 1 and 4. Such a bevel or cant forces the blade out of its kerf during the downward or non-cutting stroke (to the right in FIGS. 1 and 4), thus increasing its velocity.

The sawblades as shown in FIGS. 1 and 4 are jigsaw blades which by design are meant to be affixed in a saw by its shank end. There is nothing in this invention or execution thereof to prevent that blades are adapted to be fastened at both ends. Nor is there anything in such invention to hinder its being used in band or ribbon form or in such standard conveniences as hacksaw frames or in conjunction with hand saws, pruning saws, circular saws or the like.

The illustrated shank ends 4 and 14 can be accomodated with any required holes or appendages as needed, and such accomodations can be provided along with, or in combination with, the swaging process. A typical length for a jigsaw blade as illustrated in FIGS. 4 and 6 is a total length of approximately 72 mm (3 inches) as thickness of 1.5 mm (1/32 inches) and a width of 6 mm (¼ inches). The insert cut-out 20 and the insert 22 itself 22 would typically have a length of 40 mm (1⅝ inch) and a width of 3.5 mm (3/16 inch), and the groove 26 would have a depth of 1.5 mm (1/16 inches).

FIGS. 2, 3, 5 and 7 are drawn in magnified scale for purposes of detail, whereas an actual relief groove 10 in FIG. 3 would have a typical depth of 0.5 mm (1/32 inches) and a width of 1.0 mm (1/16 inches).

The formation of the swaging dies (both bottom and top dies) which must be used in connection with this invention, will be determined by the ultimate shape desired for the profile, tooth form etc. for the sawblade. As to the relief grooves 8 or 18 or those as illustrated by 10 in FIG. 3, these may require many different forms and variations to meet individual requirements and specifications.

The swaging operation in itself may of course result in limitations as regards possible cross-sectional shapes for a sawblade or the tooth-carrying portion 5 or 15 thereof. However, inasmuch as swaging in itself is a well-known method, persons skilled in the art will easily be able to exclude unrealistic or not-useful cross-sectional shapes.

Regarding the choice of material in connection with the invention, it is important that the materials used for the blade bodies 2, 12, respectively, should have an appropriate capability of cold-working in view of the swaging operation. The specific material in each individual case will to a great extent be dependent on or determined by the eventual use of the sawblade in question. Thus, several relatively soft steel types can be used for the manufacture of sawblades as that illustrated in FIG. 1 for cutting wood and other less hard materials, since a work hardening will occur in the blade material during the swaging operation.

While in the foregoing specification a detailed description of specific embodiments of the invention were set forth for the purpose of illustration, it will be understood that many of the details herein given may be varied considerably without departing from the spirit and scope of the invention.

I claim:

1. A sawblade, especially a jigsaw blade, characterized by comprising a blade body incorporating a cold swaged relief groove on each side surface thereof and by a cold swaged preformed slot in said blade body, and further characterized by having a toothed insert fastened into said preformed swaged slot.

2. A method for the production of saw blades, characterized by the step of forming in one continuous, but segmented cold die-swaging operation, a blade body with unset teeth along a cutting edge thereon and with a cold-swaged relief area, extending along said cutting edge on opposed side surfaces of said blade body.

3. A method as defined in claim 2, characterized by cold swage-forming said relief area as a concave relief configuration on each side surface along said cutting edge.

4. A method for the production of saw blades, especially jigsaw blades, characterized by the steps of cold die-swaging an elongate basic blade body with a cold swaged longitudinal groove on each side surface thereof and with a slot formed on the edge normally reserved for cutting teeth and subsequently affixing in said slot a pre-formed toothed insert.

* * * * *